United States Patent
Lee et al.

(10) Patent No.: US 9,659,337 B2
(45) Date of Patent: May 23, 2017

(54) UNIFIED COMMUNICATION SYSTEM AND UNIFIED COMMUNICATION METHOD USING MULTI-LOGIN, TERMINAL FOR CONTROLLING OPERATION OF UNIFIED COMMUNICATION TOOL, AND COMMUNICATION METHOD IN TERMINAL

(75) Inventors: Suk Young Lee, Seongnam-si (KR);
Soo Young Kim, Seongnam-si (KR);
Gyu Il Kim, Seongnam-si (KR); Jin Soo Park, Seongnam-si (KR); Austin Kim, Seongnam-si (KR)

(73) Assignee: NHN CORPORATION, Seongnam-si (KR)

( * ) Notice: Subject to any disclaimer, the term of this patent is extended or adjusted under 35 U.S.C. 154(b) by 276 days.

(21) Appl. No.: 13/284,237

(22) Filed: Oct. 28, 2011

(65) Prior Publication Data
US 2012/0278462 A1 Nov. 1, 2012

(30) Foreign Application Priority Data
Oct. 29, 2010 (KR) ........................ 10-2010-0107272

(51) Int. Cl.
*G06F 15/173* (2006.01)
*G06Q 50/30* (2012.01)

(52) U.S. Cl.
CPC ........... *G06Q 50/30* (2013.01); *G06F 15/173* (2013.01)

(58) Field of Classification Search
CPC .......... G06F 15/16; G06F 13/00; G06F 17/60; G06F 2221/2137; G06F 17/00;
(Continued)

(56) References Cited

U.S. PATENT DOCUMENTS 4,942,602 A * 7/1990 Baker et al. ............. 379/212.01
6,272,127 B1 * 8/2001 Golden et al. ................ 370/352
(Continued)

FOREIGN PATENT DOCUMENTS

| JP | 2004-030371 | 1/2004 |
| JP | 2005-510797 | 4/2005 |

(Continued)

OTHER PUBLICATIONS

Korean Office Action dated Dec. 15, 2014 and issued in corresponding Korean Patent Application No. 10-2010-0107272.

*Primary Examiner* — Oleg Survillo
*Assistant Examiner* — Mehulkumar Shah
(74) *Attorney, Agent, or Firm* — Harness, Dickey & Pierce P.L.C.

(57) ABSTRACT

Provided are a unified communication system and a unified communication method using multi-login, a terminal for controlling an operation of a unified communication tool, and a communication method in a terminal. The unified communication system may include a communication tool provider to provide a communication tool for at least one communication server associated with a user; a login manager to manage login information of the user when the user is logged in to two or more terminals simultaneously through respective communication tools on the two or more terminals, respectively, the login manager storing the login information of the user in a storage unit; a terminal determining unit to determine, among the two or more terminals, at least one terminal to which data associated with the user is to be transmitted based on the login information; and a communication unit to transmit the data to the at least one determined terminal.

21 Claims, 16 Drawing Sheets

(58) Field of Classification Search
CPC ...... G06F 1/00; G06F 13/01; G06F 2203/011;
G06F 9/46; G06F 15/00; G06F 15/173;
H04L 51/04; H04L 63/0428; H04L
63/0823; H04L 63/104; H04L 9/3263;
H04L 12/581; H04L 67/24; H04L 12/585;
H04L 67/303; H04L 12/5855; H04L
41/0213; H04L 29/08072; H04L 29/06;
H04L 41/22; H04L 41/12; H04L 45/02;
H04L 45/00; H04L 45/04; G06Q 50/30;
H04N 7/17; H04W 84/18
USPC .......................................... 709/223; 370/254
See application file for complete search history.

(56) References Cited

U.S. PATENT DOCUMENTS

| | | | |
|---|---|---|---|
| 7,225,249 B1* | 5/2007 | Barry et al. ................... 709/227 |
| 7,243,123 B1* | 7/2007 | Allen ..................... H04N 7/147 |
| | | | 709/204 |
| 7,823,187 B2* | 10/2010 | Tanaka et al. ..................... 726/1 |
| 2001/0023487 A1* | 9/2001 | Kawamoto ................... 713/202 |
| 2004/0205011 A1* | 10/2004 | Northington et al. .......... 705/35 |
| 2004/0223497 A1* | 11/2004 | Sanderson et al. ...... 370/395.52 |
| 2005/0114528 A1* | 5/2005 | Suito .................. H04L 12/1822 |
| | | | 709/228 |
| 2005/0148353 A1* | 7/2005 | Hicks, III ......... H04M 3/42246 |
| | | | 455/466 |
| 2005/0204158 A1* | 9/2005 | Tobe ..................... G06F 21/105 |
| | | | 726/7 |
| 2006/0064582 A1* | 3/2006 | Teal et al. ..................... 713/156 |
| 2006/0267857 A1* | 11/2006 | Zhang ....................... G06F 3/14 |
| | | | 345/1.1 |
| 2007/0118609 A1* | 5/2007 | Mullan ................. H04L 63/083 |
| | | | 709/217 |
| 2007/0288567 A1* | 12/2007 | Komlenic ............... H04L 41/04 |
| | | | 709/204 |
| 2008/0123632 A1* | 5/2008 | Lee ......................... H04L 12/66 |
| | | | 370/352 |
| 2008/0313315 A1* | 12/2008 | Karaoguz et al. ............ 709/222 |
| 2009/0031054 A1* | 1/2009 | Kato ..................... G06F 13/385 |
| | | | 710/22 |
| 2009/0044252 A1* | 2/2009 | Kashima et al. .................. 726/3 |
| 2009/0049190 A1* | 2/2009 | Jiang ..................... H04L 12/581 |
| | | | 709/238 |
| 2009/0227350 A1* | 9/2009 | Inamura .......................... 463/20 |
| 2009/0288012 A1* | 11/2009 | Hertel et al. ................... 715/738 |
| 2010/0287567 A1* | 11/2010 | Hauser ..................... G06F 3/01 |
| | | | 719/318 |
| 2011/0138024 A1* | 6/2011 | Chen et al. ................... 709/220 |
| 2011/0267985 A1* | 11/2011 | Wilkinson et al. ........... 370/259 |

FOREIGN PATENT DOCUMENTS

| | | |
|---|---|---|
| JP | 2005-318503 | 11/2005 |
| JP | 2006-019896 | 1/2006 |
| JP | 2006-127301 A | 5/2006 |
| JP | 2009-043201 | 2/2009 |
| KR | 10-2005-0086177 | 8/2005 |
| KR | 10-2006-0125948 | 12/2006 |
| KR | 10-2007-0110652 | 11/2007 |
| KR | 10-2008-0035270 | 4/2008 |

* cited by examiner

| | Environmental setting | ☒ |
|---|---|---|

| Basic setting | Set real-time conversation | Set alarm to received |
|---|---|---|

Basic execution window
⦿ Set online friends view window to basic window
◯ Set alarms view window to basic window Alarm mode
☑ Limit conversation requesting pop-up in whole screen mode
☑ Limit alarming pop-up in whole screen mode
☑ Sound alarming in response to conversation request
☑ Sound alarming in response to notification Alarm and conversation window transparency    thin ———□ thick
Alarming window display time    [5⇳] second Log-in setting ☐ Automatically execute at start
☐ Automatically log in
☐ Automatically log out of nate-on of another PC in response to log-in
☑ Display multiple log-ins state verification window in response to log-ins of multiple PCs
    Verify PC in log-in state

510

[confirm] [cancel]

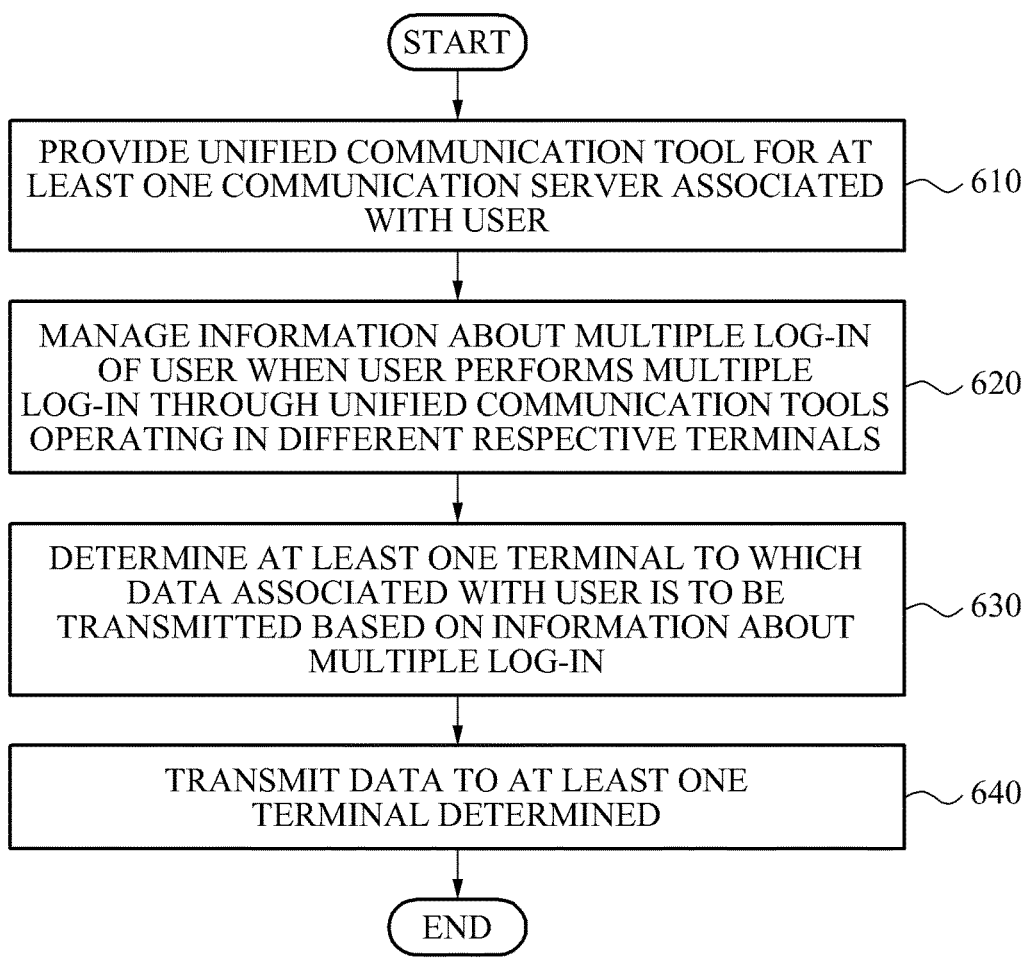

UNIFIED COMMUNICATION SYSTEM AND UNIFIED COMMUNICATION METHOD USING MULTI-LOGIN, TERMINAL FOR CONTROLLING OPERATION OF UNIFIED COMMUNICATION TOOL, AND COMMUNICATION METHOD IN TERMINAL

CROSS-REFERENCE TO RELATED APPLICATION

This application claims priority from and the benefit of Korean Patent Application No. 10-2010-0107272, filed on Oct. 29, 2010, which is hereby incorporated by reference for all purposes as if fully set forth herein.

BACKGROUND

Technical Field

Exemplary embodiments of the present invention relate to a unified communication system and a unified communication method using multi-login, a terminal for controlling an operation of a unified communication tool, and a communication method in a terminal.

Discussion of the Background

A portal site may provide a service such as an information search service and a community service, which lead to an Internet business that may be regularly used by users so as to attract regular visitors. In addition to the portal site, several web pages may provide various community sites such as an e-mail, a blog, an Internet café, and the like.

However, users may directly access each portal site to be provided with a service of a community site. As such, a conversation provided as a service between members may not proceed when a user desires to use another terminal, and a real-time conversation except a chatting service may be difficult to be provided. As an example, when a member A posts a message on an Internet café, a member B may not recognize the message before accessing the corresponding Internet café and thus, it may be difficult to have a real-time conversation. As another example, it is presumed that a member A and a member B are having a conversation through a wired terminal such as a personal computer (PC). In this case, when the member A moves to an outdoor location and desires to continue the conversation with the member B, the member A may repeatedly attempt access to the member B or the corresponding website through a wireless terminal.

SUMMARY

Exemplary embodiments of the present invention provide a method and system for unified communication that may provide a communication service any time without the need of directly accessing the corresponding service by providing a unified communication tool for at least one communication service associated with the user.

Exemplary embodiments of the present invention also provide a method and system for unified communication that may provide a unified communication service by transmitting data based on multi-login information of a user managed by the system when the user is multi-logged in through unified communication tools operating in different respective terminals.

Exemplary embodiments of the present invention also provide a method and system for unified communication that may provide a unified communication service regardless of whether a terminal used by a user is a wired terminal or a wireless terminal, whether a unified communication tool is directly installed in a terminal, and the like.

Exemplary embodiments of the present invention also provide a terminal and a communication method that may control an operation of a unified communication tool used for multi-login and a unified communication service.

Additional features of the invention will be set forth in the description which follows, and in part will be apparent from the description, or may be learned by practice of the invention.

An exemplary embodiment of the present invention provides a unified communication system, comprising: a communication tool provider to provide a communication tool for at least one communication server associated with a user; a login manager to manage login information of the user when the user is logged in to two or more terminals simultaneously through respective communication tools on the two or more terminals, respectively, the login manager storing the login information of the user in a storage unit; a terminal determining unit to determine, among the two or more terminals, at least one terminal to which data associated with the user is to be transmitted based on the login information; and a communication unit to transmit the data to the at least one determined terminal.

Another exemplary embodiment of the present invention provides a terminal, comprising: a display unit to display, on a screen, at least one of user interfaces of a unified communication tool; a data transceiver to transmit, to a unified communication system, input data entered through a user interface of the unified communication tool, and to receive, from the unified communication system, data for an operation of the unified communication tool; and a controller to control the operation of the unified communication tool using the received data, wherein, when the user is multi-logged in through unified communication tools on different respective terminals, the data for the operation of the unified communication tool is transmitted to a determined terminal among the different respective terminals based on multi-login information of the user.

Still another exemplary embodiment of the present invention provides a method that uses a processor for a unified communication, the method comprising: providing a communication tool for at least one communication server associated with a user; managing by the processor, login information of the user when the user is logged in to two or more terminals simultaneously through respective communication tools on the two or more terminals, respectively; determining by the processor, among the two or more terminals, at least one terminal to which data associated with the user is to be transmitted based on the login information; and transmitting the data to the at least one determined terminal.

Yet another exemplary embodiment of the present invention provides a method for a unified communication, the method comprising: displaying, on a screen, at least one of user interfaces of a unified communication tool; transmitting, to a unified communication system, input data entered through a user interface of the unified communication tool, and receiving, from the unified communication system, data for an operation of the unified communication tool;

and controlling the operation of the unified communication tool using the received data, wherein, when the user is multi-logged in through unified communication tools on different respective terminals, the data for the operation of the unified communication tool is transmitted to a determined terminal among the different respective terminals based on multi-login information of the user.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and along with the description serve to explain the principles of the invention.

FIG. 5 is a diagram to illustrate a user interface to determine an environmental setting according to exemplary embodiments of the present invention.

FIG. 6 is a flowchart to illustrate a method for unified communication according to exemplary embodiments of the present invention.

DETAILED DESCRIPTION OF THE ILLUSTRATED EMBODIMENTS

Figure 1:
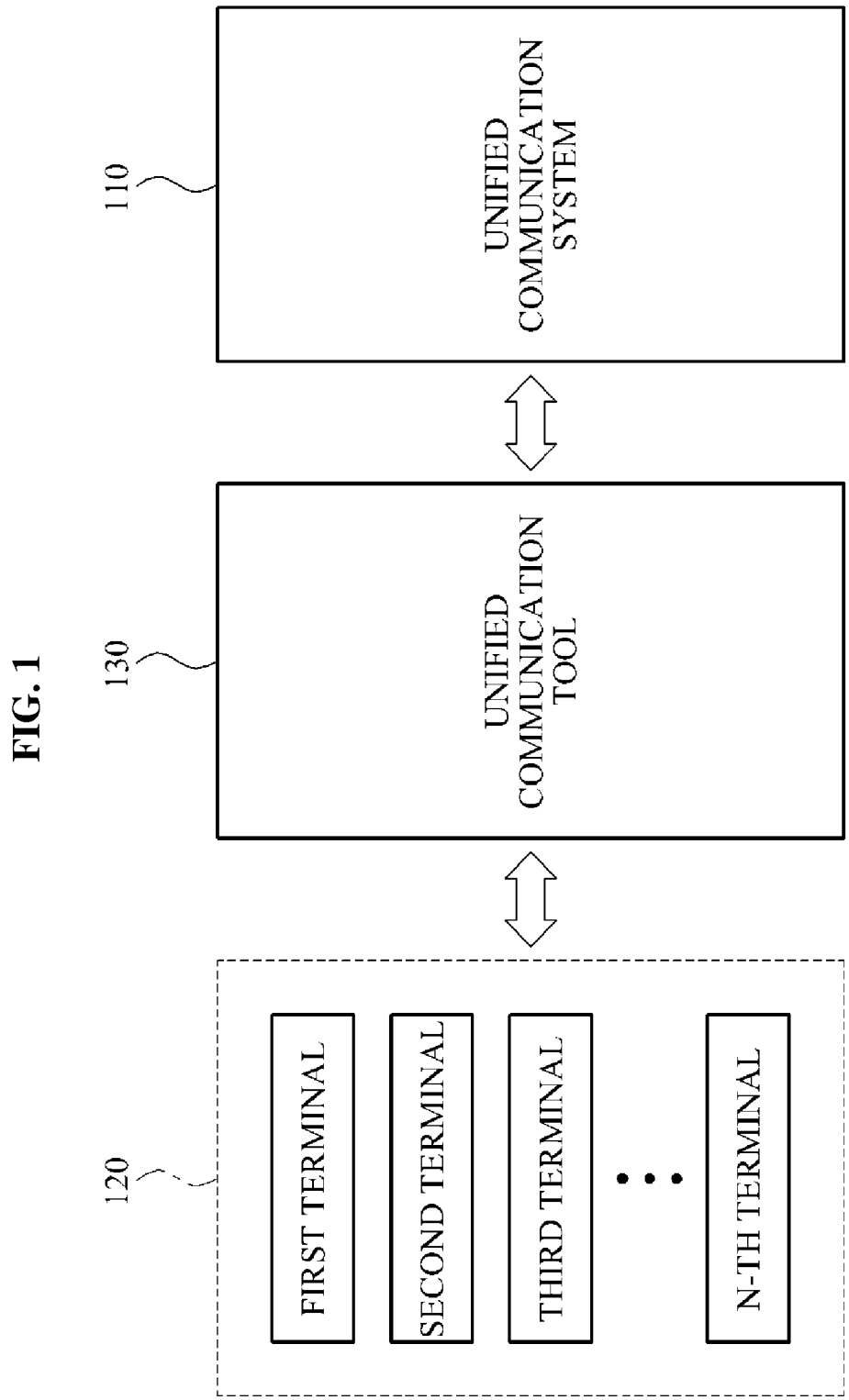
FIG. 1 is a diagram to illustrate a unified communication system and a plurality of terminals according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It should be understood that any element, operation or command described herein is not to be construed as being an essential or principle feature of the present disclosure unless otherwise explicitly described. As used herein, the singular forms "a", "an" and "the" are intended to include the plural forms as well unless otherwise indicated. If only a single item is intended, the term "one" or similar terms will be used herein. Throughout the drawings and the detailed description, unless otherwise described, the same drawing reference numerals are understood to refer to the same elements, features, and structures. The relative size and depiction of these elements may be exaggerated for clarity, illustration, and convenience.

FIG. 1 is a diagram to illustrate a unified communication system and a plurality of terminals according to exemplary embodiments of the present invention. FIG. 1 illustrates a unified communication system 110, a plurality of terminals 120, and a unified communication tool 130. Here, the unified communication system 110 may enable a user to participate in a community activity through the unified communication tool 130 without the need of directly accessing the corresponding community site (or communication server).

The unified communication tool 130 may operate in several different types of environments. For example, the unified communication tool may operate as an overlay module on a web browser in a terminal capable of utilizing the web browser. In other examples, the unified communication tool 130 may operate in an environment where the unified communication tool is installed and operates in a wired terminal, and in an environment where the unified communication tool is installed and operates in a wireless terminal. For example, when the unified communication tool 130 operates as an overlay module on a web browser, the unified communication tool 130 may be provided in a form of application software that may be used on the web browser via the Internet or an Intranet connection. The application software does not need to be installed in the terminal, and may operate as an overlay module on a web browser. The unified communication tool 130 may be provided in a form of application software installed in a wired terminal or a wireless terminal.

The unified communication system 110 may enable services of a community site to be provided to the plurality of terminals 120 anytime and anywhere. To provide services anytime and anywhere, the unified communication system 110 may enable a user to be multi-logged in, and may manage multi-login information so as to enable the user to receive information associated with a community or upload information about the user through any terminal among the plurality of terminals 120.

The communication functionality described above may be provided to multiple terminals in a unified manner through multi-login. For example, let's assume that user A is having a real-time conversation with user B at home through the unified communication tool 130 installed in a wired terminal such as a personal computer (PC). In this case, when user A moves to an outdoor location during the real-time conversation, user A may continue the conversation with user B by multi-login through the unified communication tool 130 installed in a wireless terminal. If multi-login is not available, the wired terminal will be switched to a log-out state in response to login through the unified communication tool 130 operating in the wireless terminal. Thus, the conversation with user B may be discontinued, user A will have to reconnect to user B, and content of the previous conversation will disappear unless user A stores the content separately.

As another example, the unified communication tool 130 may perform at least one of the following: to provide a user with notification data transmitted from a communication server, to transmit input data by the user to the communication server, and to support a real-time conversation between the user and another user through the communication server. While it may be difficult to have a real-time conversation through a community site such as an Internet café, a blog, and the like, the unified communication system 110 may provide notification data such as a notification message, a new message notification, and the like in various communication sites such as an Internet café, a blog, and the like to the corresponding terminal using the unified communication tool 130 to which a user is logged in (or multi-logged in), thereby reporting updates, and the like associated with the user, and may enable a real-time conversation such as chatting between users who are logged in through the unified communication tool 130. In the exemplary embodiment, if the user is multi-logged in, the notification data may be provided to all terminals which the user is multi-logged in so as to rapidly provide the notification data to the user.

Hereinafter, the unified communication system 110, the unified communication tool 130, and the plurality of terminals 120 on which the unified communication tool 130 operates will be described in more detail.

Figure 2:
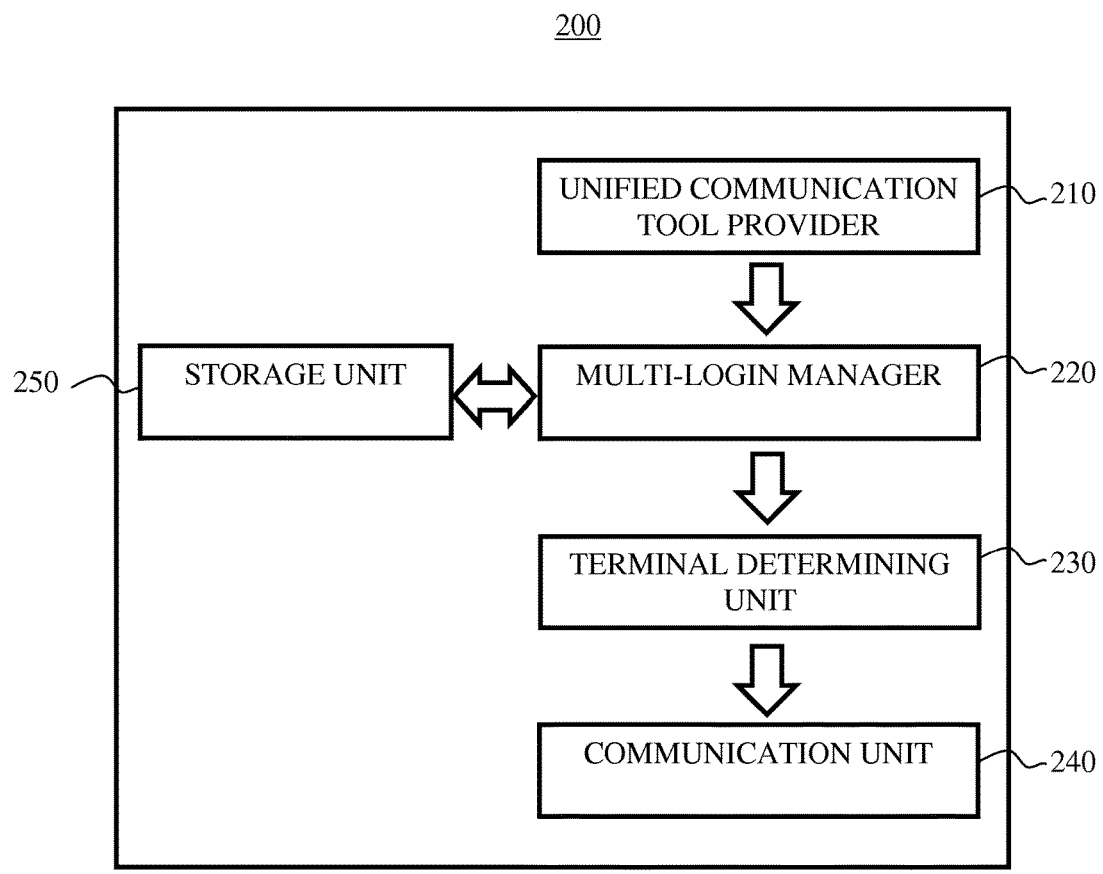
FIG. 2 is a block diagram to illustrate an internal configuration of a unified communication system according to an exemplary embodiment of the present invention.

FIG. 2 is a block diagram to illustrate an internal configuration of a unified communication system 200 according to an exemplary embodiment of the present invention.

As shown in FIG. 2, the unified communication system 200 may include a unified communication tool provider 210, a multi-login manager 220, a terminal determining unit 230, a communication unit 240, and a storage unit 250.

The unified communication tool provider 210 may provide a unified communication tool for at least one communication server associated with a user. Here, a communication server may refer to a server that provides a community site service that the user subscribes. In the exemplary embodiment, the unified communication tool may perform at least one of the following: to provide the user with notification data transmitted from the communication server, to transmit input data by the user to the communication server, and to support a real-time conversation between the user and another user through the communication server. The user may be provided with services of a community site by logging-in through the unified communication tool without the need of directly accessing the community site (or communication server). If a user subscribes to a plurality of community sites (or a plurality of communication servers) such as a blog, an e-mail, an Internet café, a mini-homepage, and the like, the user may receive notification data for a new message or have a real-time conversation with another user (for example, a blog neighbor) of a predetermined community site among the plurality of community sites through the unified communication tool without the need of visiting each of the plurality of community sites individually.

In the exemplary embodiment, a user may post a message on a personal webpage of the user, or send a mail using the unified communication tool. The user may receive a notification message for a message posted on the personal webpage by another user, or a notification message reporting an arrival of a mail delivered to the user. A uniform resource locator (URL), an entire content, or a portion of content of a webpage currently viewed by the user may be posted on the personal webpage of the user, or may be forwarded to another user using the unified communication tool.

The multi-login manager 220 may manage multi-login information, i.e., information about multi-login, of a user when the user is multi-logged in through unified communication tools operating in different respective terminals. For example, the multi-login manager 220 may store the multi-login information in the storage unit 250. The multi-login manager 220 may manage multi-login information for each user, including information indicating which terminals have the unified communication tools currently in operation for the corresponding user who is multi-logged in. The storage unit 120 may include a Read Only Memory (ROM) or a Random Access Memory (RAM), and include at least one magnetic disk storage device, a flash memory device, or a non-volatile memory such as a non-volatile solid-state memory device.

In the exemplary embodiment, the unified communication tool may operate in at least two environments among the following: in an environment where the unified communication tool operates as an overlay module on a web browser, in an environment where the unified communication tool is installed and operates in a wired terminal, and in an environment where the unified communication tool is installed and operates in a wireless terminal.

The terminal determining unit 230 may determine at least one terminal to which data associated with the user is to be transmitted based on the multi-login information.

In the exemplary embodiment, the terminal determining unit 230 may determine the at least one terminal based on at least one of a user event occurring on terminals to which the user is multi-logged in, an operational environment of the unified communication tool used for the multi-login, and information on an environmental setting of the unified communication tool.

As an example, the terminal determining unit 230 may determine, as a candidate of the at least one terminal to which data associated with the user is to be transmitted, a terminal on which the latest user event has occurred among all terminals based on the multi-login information.

As another example, the terminal determining unit 230 may determine terminals in different manners depending on operational environments of respective unified communication tools currently in operation. In case of the unified communication tool or tools operating as overlay modules on a web browser, the determination of terminals may be made so that data associated with the user may be transmitted to all terminals. On the other hand, in case of a unified communication tool operating in a wired terminal and a unified communication tool operating in a wireless terminal, the determination of terminals may be made so that data associated with the user may be transmitted to the terminal on which the latest user event has occurred.

As still another example, a user may predetermine a type of data desired to be received by a unified communication tool through an environmental setting of the corresponding unified communication tool. In the exemplary embodiment, the terminal determining unit 230 may determine a terminal to which data associated with the user is to be transmitted using information of the environmental setting.

As yet another example, when the data associated with the user corresponds to notification data, the terminal determining unit 230 may determine a terminal to which data associated with the user is to be transmitted so that the notification data may be forwarded to all terminals to which the user is multi-logged in based on the multi-login information. The notification data to inform the user of a newly posted message, an access by a friend, and the like may be transmitted to all terminals to which the user is multi-logged in.

In the above-described embodiments, the multi-login manager 220 may further store and manage, as the multi-login information, information on a terminal that has generated the latest user event, information on an operational environment of each unified communication tool, information on an environmental setting of each unified communication tool, and the like.

The communication unit 240 may transmit the data to the at least one determined terminal. When the multi-login manager 220 manages the multi-login information, and the terminal determining unit 230 determines a terminal to which data associated with a user is to be transmitted, the communication unit 240 may transmit the data associated with the user to the determined terminal, thereby providing the user with an update associated with the community rapidly.

In the exemplary embodiment, in case of the unified communication tool operating as an overlay module on a web browser, the unified communication tool may provide the same user interface to a plurality of Internet windows activated by a web browser. In the exemplary embodiment, operations based on the data received from the unified communication tool may be performed in the same manner for the same user interface which is provided to each of the plurality of Internet windows. When the user opens multiple Internet windows, the same user interface may be provided to the plurality of Internet windows, and the same operation will be performed based on the received data and thus, the user may recognize a notification of a newly posted message, an access by a friend, and the like through any Internet windows.

The unified communication tool may include a user interface which enables the user to set at least one attribute, in response to the user's login, comprising whether the user maintains a login status in a unified communication tool of any other terminal which the user is multi-logged in.

The unified communication tool may further include a user interface which allows the user to set a login status either to an online state or to an offline state. In the exemplary embodiment, information on the login status of each unified communication tool of terminals which the user is multi-logged in may be synchronized with a login status set by the user.

In the exemplary embodiment, the communication unit 240 may transmit, to each of terminals to which the user is multi-logged in, terminal information about the terminals to which the user is multi-logged in. Here, the terminal information may include at least identification (ID) information of each terminal. In the exemplary embodiment, each of the unified communication tools operating in terminals to which the user is multi-logged in may include a user interface to display the terminal information to the user. Each of the unified communication tools may be configured to inform the user of which terminals the user is multi-logged in to. Each of the unified communication tools operating in terminals to which the user is multi-logged in may further include a user interface which allows the user to set whether the terminal information is displayed.

Figure 3:
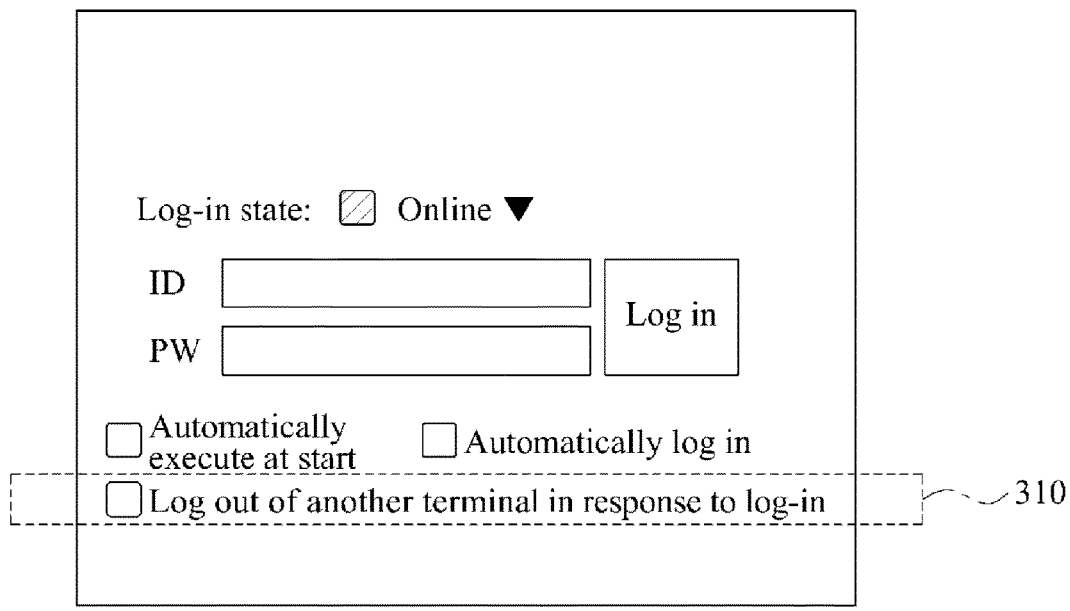
FIG. 3 is a diagram to illustrate a user interface for login according to exemplary embodiments of the present invention.

FIG. 3 is a diagram to illustrate an example of a user interface for login according to exemplary embodiments of the present invention.

A user interface 300 is configured to implement the following functions: user authentication using an input identification (ID) and password (PW) of a user, determining an online state of the user, and determining settings. Here, a dotted box 310 illustrates determining whether the unified communication tools of other terminals should be logged out when logging in to the corresponding terminal. That is, if the user selects the corresponding operation and logs in, the unified communication tools of other terminals should be logged out.

Also, if necessary, the corresponding functions may be provided only to unified communication tools operating in wired terminals. In such case, if the user selects the corresponding function and logs in to one of the wired terminals through the unified communication tool operating in the wired terminal, it is also possible to set so that only unified communication tools in other wired terminals to which the user is multi-logged in are logged out. A similar setting may be applied to unified communication tools operating in wireless terminals or unified communication tools operating as overlay modules on a web browser.

Figure 4:
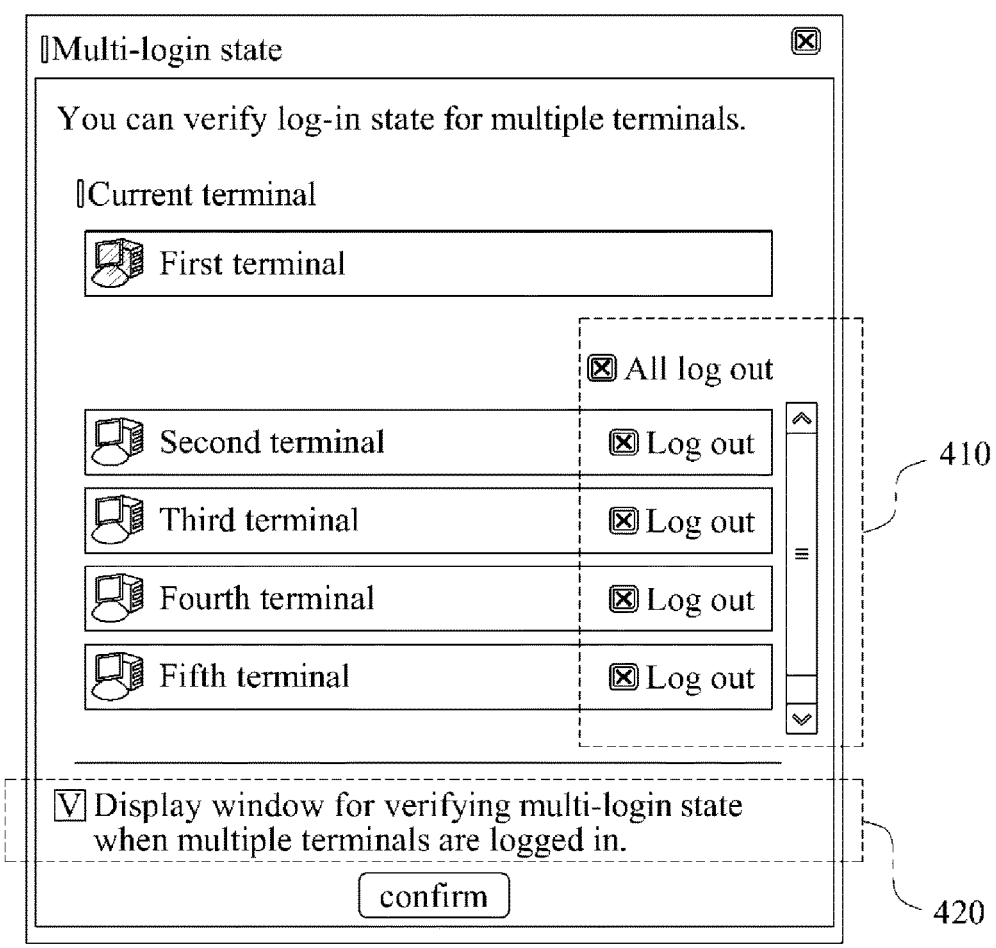
FIG. 4 is a diagram to illustrate an example of a user interface to provide information about terminals in a multi-login state according to exemplary embodiments of the present invention.

FIG. 4 is a diagram to illustrate an example of a user interface to provide information about terminals in a multi-login state according to exemplary embodiments of the present invention.

A user interface 400 illustrates terminal information about terminals to which the user is multi-logged in. The user interface 400 illustrates an identifier of the current terminal, and identifiers of other terminals to which the user is multi-logged in.

Here, a first dotted box 410 illustrates an operation of logging out other terminals to which the user is multi-logged in by the current terminal. In the exemplary embodiment, other terminals to which the user is multi-logged in may be concurrently or separately logged out by the current terminal. A second dotted box 420 illustrates an operation of determining, by a user, whether to display the terminal information.

In the exemplary embodiment, the user interface 400 may display the terminal information for all terminals, may display wired terminals and wireless terminals separately, or may display wired terminals only or wireless terminals only.

FIG. 5 is a diagram to illustrate an example of a user interface for an environmental setting according to exemplary embodiments of the present invention.

A user interface 500 illustrates various functions for environmental setting of a unified communication tool. In the exemplary embodiment, the main purpose of user interface 500 shown in FIG. 5 is to set up various functions of a unified communication tool operating in a wired terminal. A first dotted box 510 illustrates a function of allowing a user to determine whether to log out of other unified communication tools when logging in to a corresponding unified communication tool, a function of allowing a user to set as to whether to display terminal information of terminals to which the user is multi-logged in at the time of multi-login, a function of verifying terminals to which the user is multi-logged in, and the like. In the exemplary embodiment, FIG. 5 illustrates an example of the user interface 500 of a unified communication tool for a wired terminal.

FIG. 6 is a flowchart to illustrate a method for a unified communication according to exemplary embodiments of the present invention. The method for a unified communication according to exemplary embodiments of the present invention may be performed by the unified communication system 200 described with reference to FIG. 2. FIG. 6 illustrates a method for a unified communication comprising operations performed by the unified communication system 200.

In operation 610, the unified communication system 200 may provide a unified communication tool for at least one communication server associated with a user. Here, a communication server may refer to a server providing a community site service that the user subscribes. In the exemplary embodiment, the unified communication tool may perform at least one of the following: to provide the user with notification data transmitted from the communication server, to transmit input data by the user to the communication server, and to support a real-time conversation between the user and another user through the communication server. The user may be provided with services of a community site by logging in through the unified communication tool without the need of directly accessing the community site (or communication server). If a user subscribes to a plurality of community sites (or a plurality of communication servers) such as a blog, an e-mail, an Internet café, a mini-homepage, and the like, the user may receive notification data for a new message or have a real-time conversation with another user (for example, a blog neighbor) of a predetermined community site among the plurality of community sites through the unified communication tool without the need of visiting each of the plurality of community sites.

In the exemplary embodiment, a user may post a message on a personal webpage of the user, or send a mail using the unified communication tool. The user may receive a notification message for a message posted on the personal webpage by another user, or a notification message reporting an arrival of a mail delivered to the user. A uniform resource locator (URL), an entire content, or a portion of content of a webpage currently viewed by the user may be posted on the personal webpage of the user, or may be forwarded to another user using the unified communication tool.

In operation 620, the unified communication system 200 may manage multi-login information of a user when the user is multi-logged in through unified communication tools operating in different respective terminals. For example, the unified communication system 200 may store and manage, for each user, information of terminals indicating which terminals the unified communication tools of the corresponding user is multi-logged in.

In the exemplary embodiment, a unified communication tool may operate in at least two environments among the following: in an environment where the unified communication tool operates as an overlay module on a web browser, in an environment where the unified communication tool is installed and operates in a wired terminal, and in an environment where the unified communication tool is installed and operates in a wireless terminal.

In operation 630, the unified communication system 200 may determine at least one terminal to which data associated with the user is to be transmitted based on the multi-login information.

In the exemplary embodiment, the unified communication system 200 may determine the at least one terminal based on at least one of a user event occurring on one or more of the terminals to which the user is multi-logged in, an operational environment of the unified communication tool used for the multi-login, and information on an environmental setting of the unified communication tool.

As an example, the unified communication system 200 may determine, as a candidate of the at least one terminal to which the data associated with the user is to be transmitted, a terminal on which the latest user event has occurred among all terminals based on the multi-login information.

As another example, the unified communication system 200 may determine terminals in different manners depending on operational environments of respective unified communication tools currently in operation. In case of the unified communication tool operating as an overlay module on a web browser, the determination of terminals may be made so that data associated with the user may be transmitted to all terminals. On the other hand, in case of a unified communication tool operating in a wired terminal and a unified communication tool operating in a wireless terminal, the determination of terminals may be made so that data associated with the user may be transmitted to the terminal on which the latest user event has occurred.

As still another example, a user may predetermine a type of data desired to be received by a unified communication tool through an environmental setting of the corresponding unified communication tool. In the exemplary embodiment, the unified communication system 200 may determine a terminal to which data associated with the user is to be transmitted using information of the environmental setting.

As yet another example, when the data associated with the user corresponds to notification data, the unified communication system 200 may determine a terminal to which data associated with the user is to be transmitted so that the notification data may be forwarded to all terminals to which the user is multi-logged in based on the multi-login information. The notification data to inform the user of a newly posted message, an access by a friend, and the like may be transmitted to all terminals to which the user is multi-logged in.

In the above-described embodiments, the unified communication system 200 may further store and manage, as the multi-login information, information on a terminal that has generated the latest user event, information on an operational environment of each unified communication tool, information on an environmental setting of each unified communication tool, and the like.

In operation 640, the unified communication system 200 may transmit the data to the at least one determined terminal. When the unified communication system 200 manages the multi-login information in operation 620, and determines a terminal to which data associated with a user is to be transmitted in operation 630, the unified communication system 200 may transmit the data associated with the user to the determined terminal in operation 640, thereby providing the user with an update associated with a community rapidly.

In the exemplary embodiment, in case of the unified communication tool operating as an overlay module on a web browser, the unified communication tool may provide the same user interface to a plurality of Internet windows activated by the web browser. In the exemplary embodiment, operations based on the data received from the unified communication tool may be performed in the same manner for the same user interface which is provided to each of the plurality of Internet windows. When the user opens multiple Internet windows, the same user interface may be provided to the plurality of Internet windows, and the same operation will be performed based on the received data and thus, the user may recognize a notification of a newly posted message, an access by a friend, and the like through any Internet windows.

The unified communication tool may include a user interface which enables the user to set at least one attribute, in response to the user's login, comprising whether the user maintains a login status in a unified communication tool of any other terminal to which the user is multi-logged in.

The unified communication tool may further include a user interface which allows the user to set a login status either to an online state or to offline state. In the exemplary embodiment, information on the login status of each unified communication tool of terminals to which the user is multi-logged in may be synchronized with a login status set by the user.

In the exemplary embodiment, the unified communication system 200 may transmit, to each of terminals to which the user is multi-logged in, terminal information about the terminals to which the user is multi-logged in. Here, the terminal information may include at least ID information of each terminal. In the exemplary embodiment, each of the unified communication tools operating in terminals to which the user is multi-logged in may include a user interface to display the terminal information to the user. Each of the unified communication tools may be configured to inform the user of which terminals the user is multi-logged in to. Each unified communication tool operating in terminals to which the user is multi-logged in may further include a user interface which allows the user to set as to whether the terminal information should be displayed.

Figure 7:
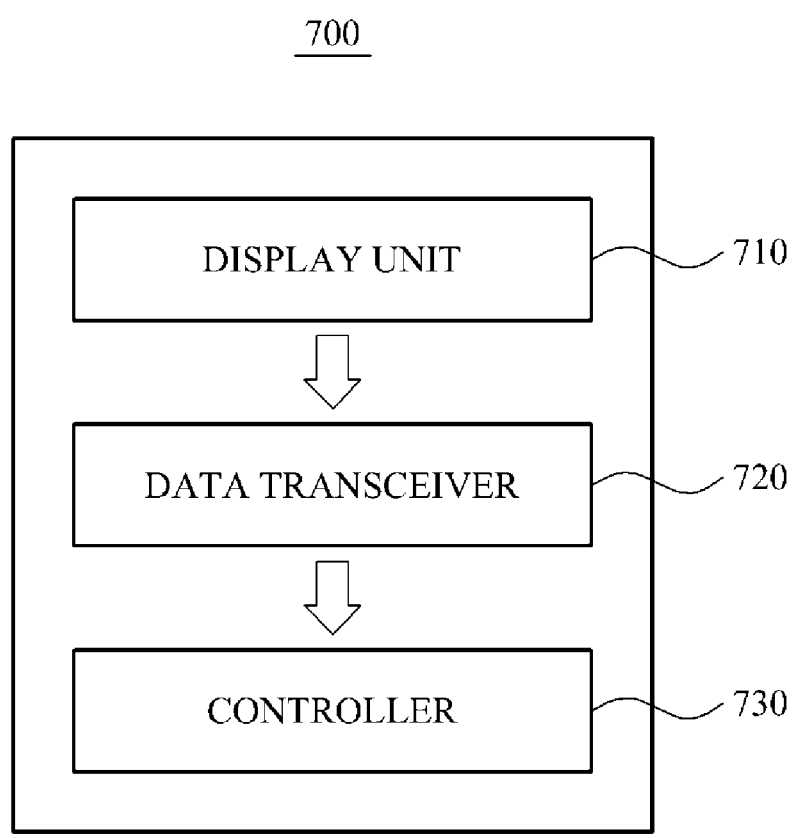
FIG. 7 is a block diagram to illustrate an internal configuration of a terminal according to exemplary embodiments of the present invention.

FIG. 7 is a block diagram to illustrate an internal configuration of a terminal according to exemplary embodiments of the present invention.

A terminal 700 according to exemplary embodiments of the present invention may correspond to a terminal on which the unified communication tool described above operates. As shown in FIG. 7, the terminal 700 may include a display unit 710, a data transceiver 720, and a controller 730.

The display unit 710 may display, on a screen, at least one of user interfaces of a unified communication tool. Here, the unified communication tool may operate in at least two environments among the following: in an environment where the unified communication tool operates as an overlay module on a web browser, in an environment where the unified communication tool is installed and operates in a wired terminal, and in an environment where the unified communication tool is installed and operates in a wireless terminal.

In the exemplary embodiment, when the terminal 700 uses a unified communication tool operating as an overlay module on a web browser, the display unit 710 may display, on a screen, an Internet window activated by the web browser, and may display, on a screen, a user interface of the unified communication tool. When a plurality of Internet windows are activated by the web browser, the unified communication tool may provide the same user interface to each of the plurality of Internet windows activated by the web browser.

When the terminal 700 uses a unified communication tool in the environment where the unified communication tool is installed and operates in a wired terminal, or in the environment where the unified communication tool is installed and operates in a wireless terminal, the display unit 710 may display directly on a screen, user interfaces of the unified communication tool.

The data transceiver 720 may transmit, to the unified communication system 200 of FIG. 2, input data entered through a user interface of the unified communication tool, and may receive, from the unified communication system 200, data for an operation of the unified communication tool.

In the exemplary embodiment, when a user logging in through a unified communication tool that operates in the terminal 700 is multi-logged in through the unified communication tool in at least one another terminal, a terminal to which data for an operation of the unified communication tool is to be transmitted may be determined based on information about the multi-login of the user. As described above, the information about the multi-login may be managed in the unified communication system 200, and in response to a user's multi-login, the unified communication system 200 may determine a terminal to which data for an operation of the unified communication tool is to be transmitted based on the information about the multi-login of the user.

For example, the terminal to which data for an operation of the unified communication tool is to be transmitted may be determined further based on at least one of an event occurring on terminals to which the user is multi-logged in, an operational environment of the unified communication tool used for the multi-login, and an environmental setting of the unified communication tool. A method for determining the terminal to which the data is to be transmitted is described above with reference to FIG. 2 through FIG. 6 and thus, further descriptions will be omitted for conciseness.

The controller 730 may control the operation of the unified communication tool using the received data. For example, when the received data corresponds to notification data, the controller 730 may control the operation of the unified communication tool so that the corresponding user interface of the unified communication tool may be displayed on a screen through the display unit 710.

Figure 8:
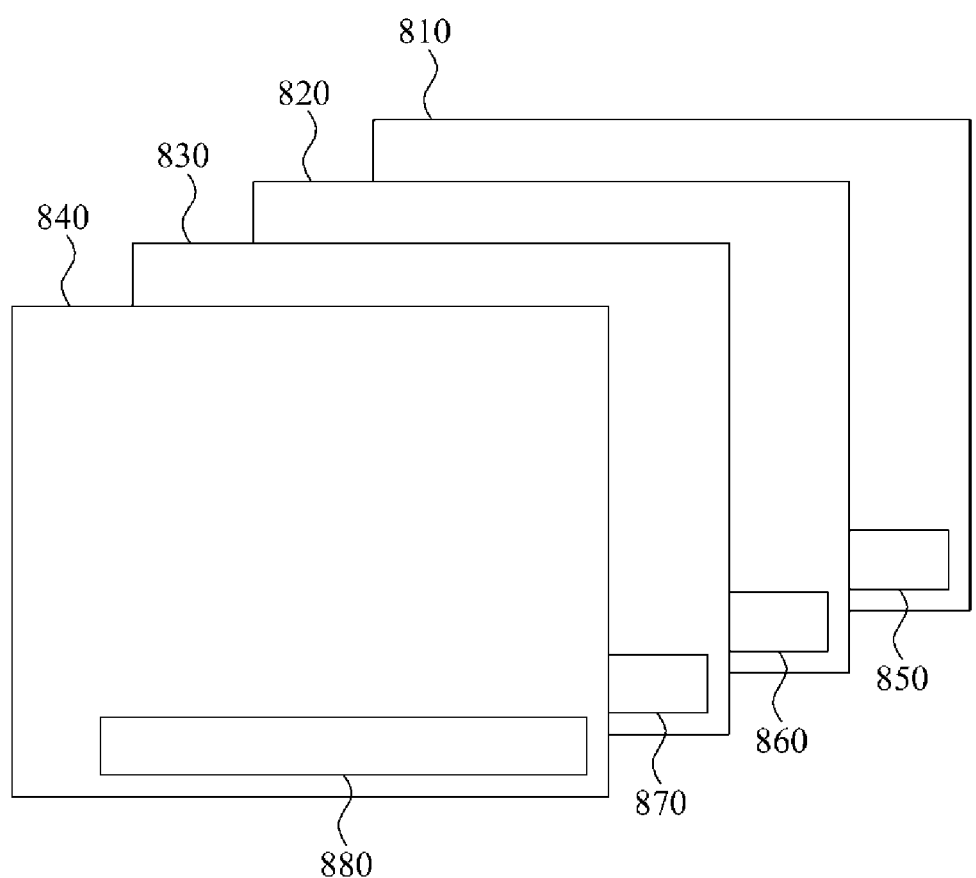
FIG. 8 is a diagram to illustrate a plurality of Internet windows activated via a web browser and user interfaces of a unified communication tool according to exemplary embodiments of the present invention.

FIG. 8 is a diagram to illustrate a plurality of Internet windows activated via a web browser and user interfaces of a unified communication tool according to exemplary embodiments of the present invention. FIG. 8 illustrates four Internet windows 810 through 840 activated by a web browser and user interfaces 850 through 880 of a unified communication tool operating in each of the four Internet windows 810 through 840. In the exemplary embodiment, each of the user interfaces 850 through 880 may operate in the same manner for all data occurring to a user.

FIG. 8 illustrates Internet windows activated on a terminal. However, if a user is multi-logged in a plurality of terminals through the unified communication tool, user interfaces of the unified communication tool may operate in the same manner for all Internet windows activated in the plurality of terminals.

FIG. 9 through FIG. 13 illustrate examples of user interfaces that may be provided by the unified communication tool. However, the user interfaces are merely examples for describing the present invention, and may not be limited thereto.

Figure 9:
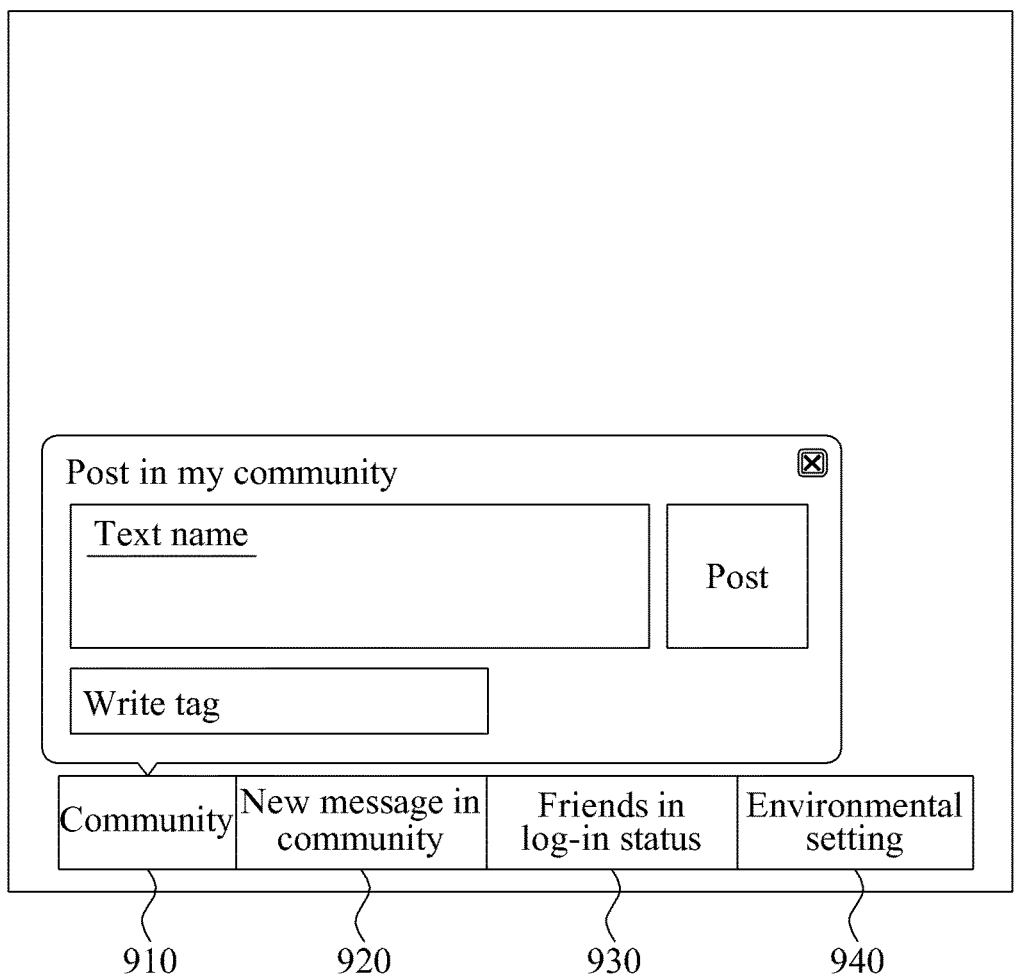
FIG. 9 is a diagram to illustrate a user interface to post a message associated with a web document in a community according to exemplary embodiments of the present invention.

FIG. 9 is a diagram to illustrate a user interface to post a message associated with a web document in a community according to exemplary embodiments of the present invention. FIG. 9 illustrates an Internet window 900 activated by a web browser. In the embodiment, a unified communication tool may operate as an overlay module on the Internet window 900. As an example, FIG. 9 illustrates user interfaces entitled "Community" 910, "New message in community" 920, "Friends in login status" 930, and "Environmental setting" 940. Among the user interfaces, a user interface entitled "Community" 910 may be configured to post, in a community, a message associated with a web document provided to a user by the current Internet window 900. The user may post a message associated with a current web document in a community site quickly and easily without the need of accessing the corresponding community site.

As another example, the user interface entitled "Community" 910 may be configured to set as to whether a user feels sympathy and interest for a current web document.

Figure 10:
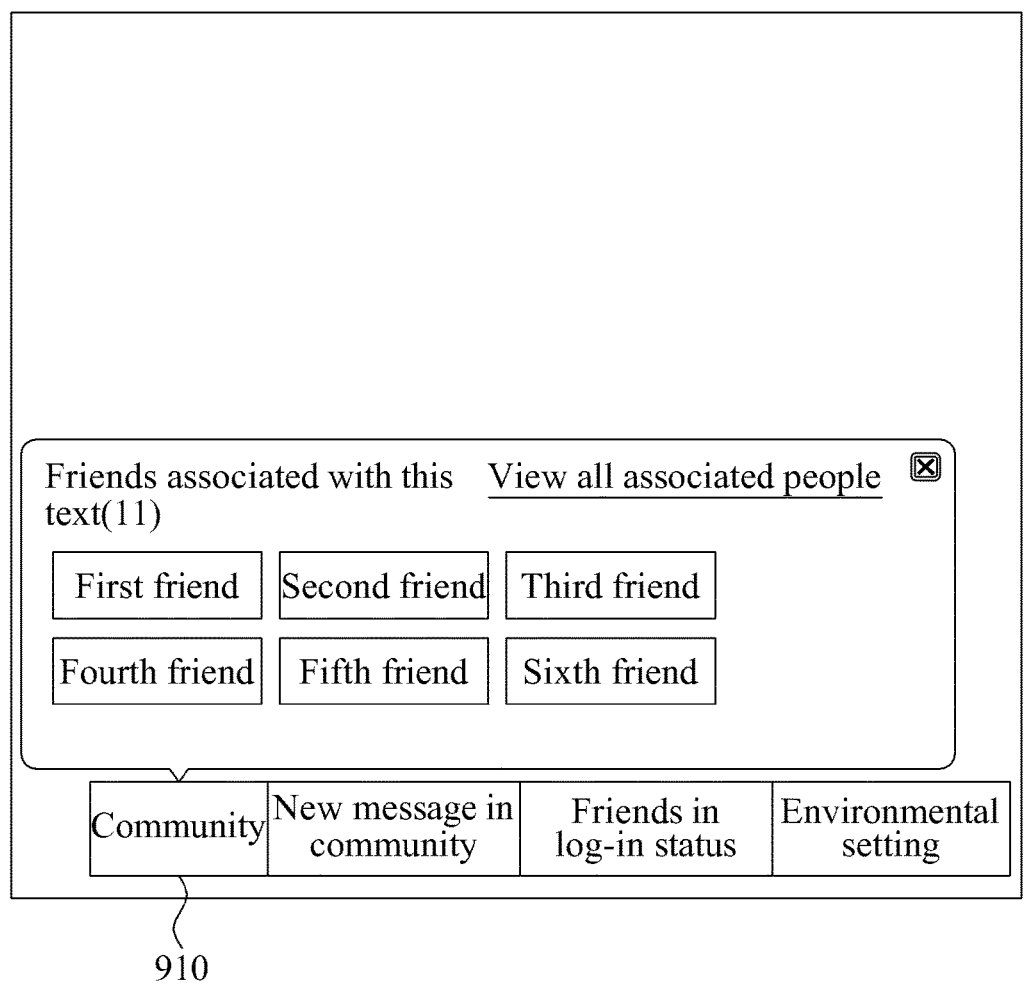
FIG. 10 is a diagram to illustrate a user interface to provide information about other users associated with a web document according to exemplary embodiments of the present invention.

FIG. 10 is a diagram to illustrate a user interface to provide information about other users associated with a web document according to exemplary embodiments of the present invention. FIG. 10 illustrates that information about friends who post messages associated with a current web document or setting sympathy and interest for the current web document is provided to a user. The corresponding operation may be provided through the user interface entitled "Community" 910.

Figure 11:
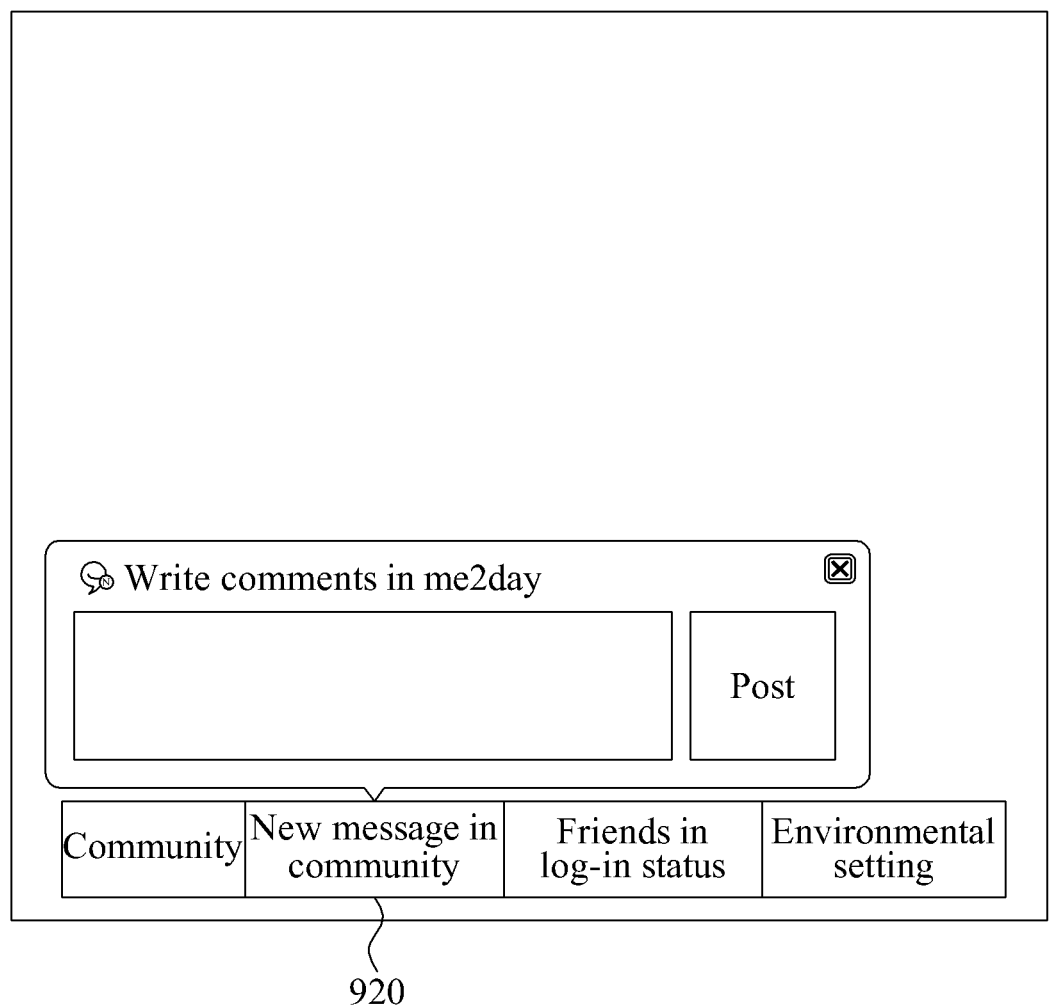
FIG. 11 is a diagram to illustrate a user interface to post a comment in response to a message in a community according to exemplary embodiments of the present invention.

FIG. 11 is a diagram to illustrate a user interface to post a comment in response to a message in a community according to exemplary embodiments of the present invention. Among user interfaces appearing on an Internet window 900, a user interface entitled "New message in community" 920 may include a function of informing a user that a new message is posted in response to another user registered as a friend or a neighbor posting the new message in a community site. As shown in FIG. 11, the user interface entitled "New message in community" 920 may further include a function of posting a comment for a newly posted message. Through the functions described above, the user may be informed of an update of a community site, and may express opinions by posting a comment on the update without the need of accessing the corresponding community site.

Figure 12:
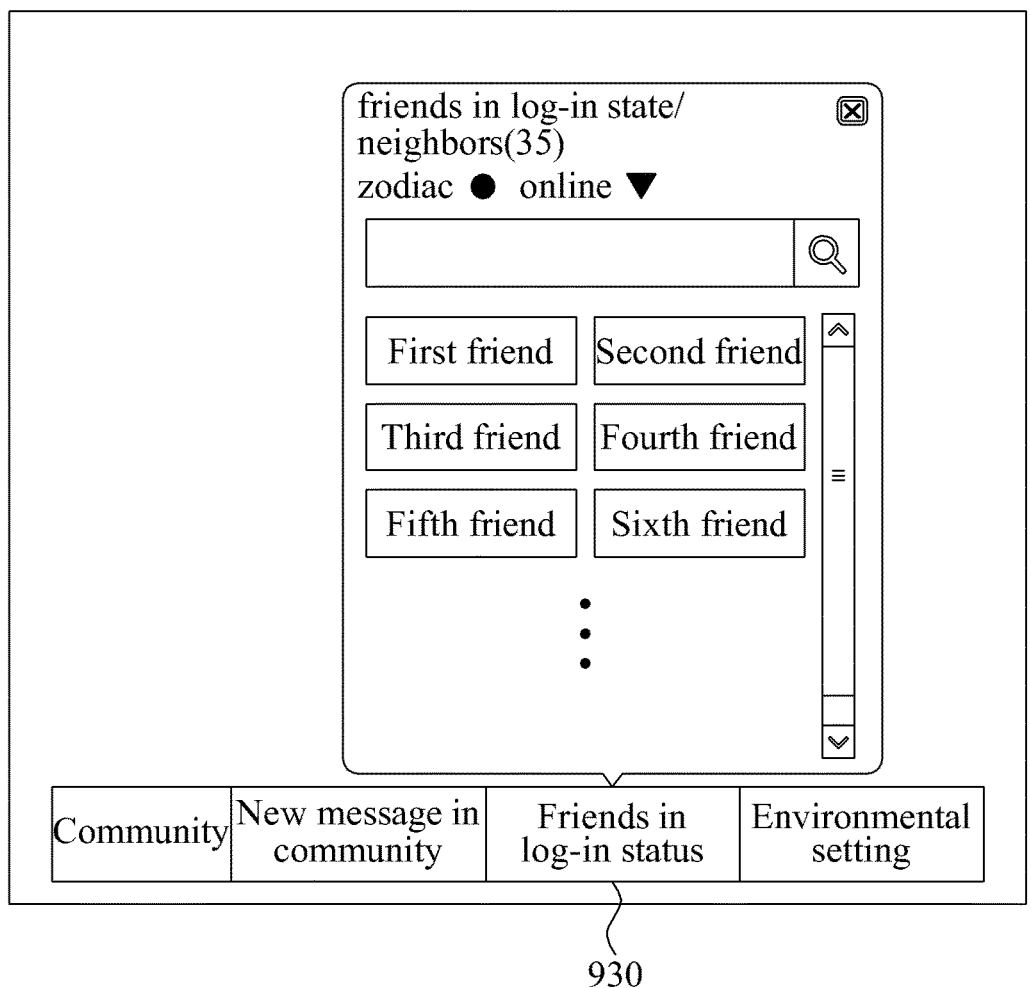
FIG. 12 is a diagram to illustrate a user interface to provide information about other users associated with a user according to exemplary embodiments of the present invention.

FIG. 12 is a diagram to illustrate a user interface to provide information about other users associated with a user according to exemplary embodiments of the present invention. As shown in FIG. 12, among user interfaces appearing on an Internet window 900, a user interface showing a list of friends in login status 930 may include a function of providing information about friends or neighbors currently online. In the exemplary embodiment, the user may send a message such as mail or a note to one or more of the friends or neighbors currently online, and may have a conversation with one or more of the friends or neighbors currently online.

Figure 13:
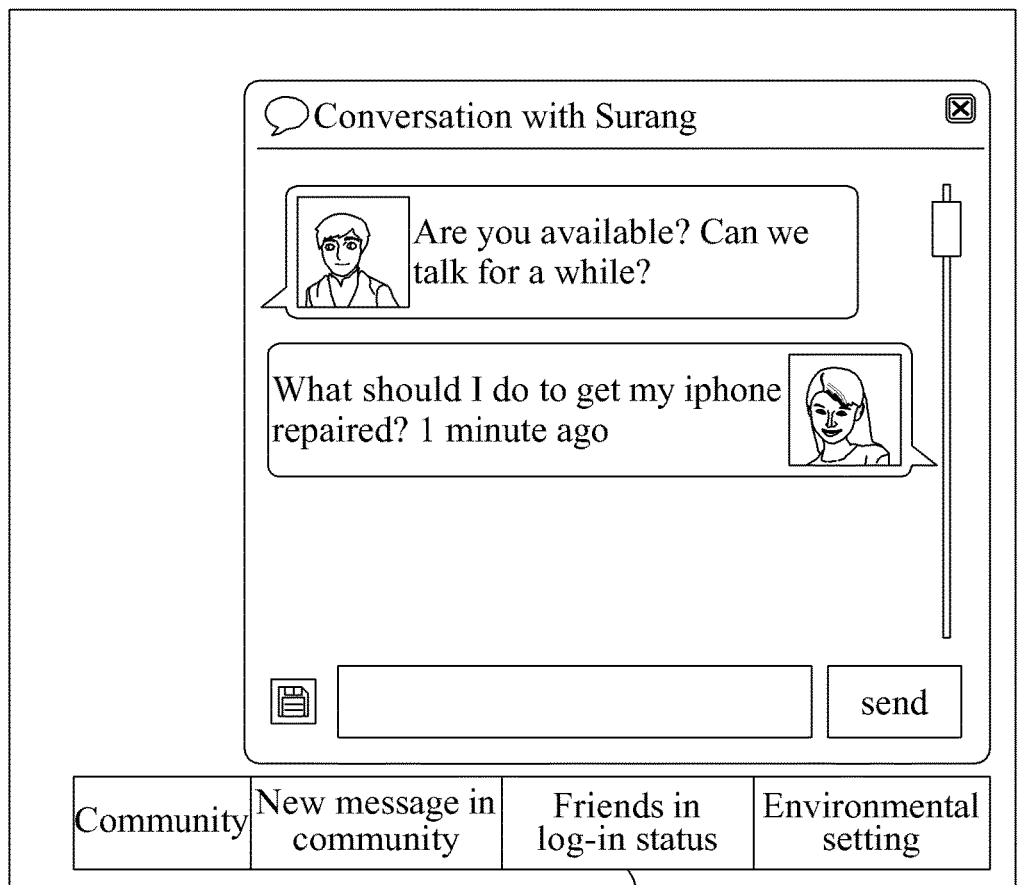
FIG. 13 is a diagram to illustrate a user interface for a conversation with another user according to exemplary embodiments of the present invention.

FIG. 13 is a diagram to illustrate a user interface for a conversation with another user according to exemplary embodiments of the present invention. FIG. 13 illustrates an example of chatting with one of friends in an online state.

As described above, notification data to inform a user that a new message is posted, a message such as a mail or a note has arrived from a friend or neighbor, or a conversation has been requested from a friend or neighbor may be transmitted to all terminals to which the user is multi-logged in. In the exemplary embodiment, the user may obtain an update associated with a community, and may have a real-time conversation with other users rapidly and easily. For example, the user may recognize a new message is posted through a wireless terminal, may transmit a message to another user posting a new message through a wireless terminal, and may have a chat with another user posting a new message through a wired terminal in a multi-login state. Further, the user may have a conversation with another user in an online state.

FIG. 9 through FIG. 13 illustrate examples of user interfaces used for a unified communication tool operating as an overlay module on a web browser. However, the user interfaces may be similarly used for a unified communication tool operating in a wired terminal, or operating in a wireless terminal.

Figure 14:
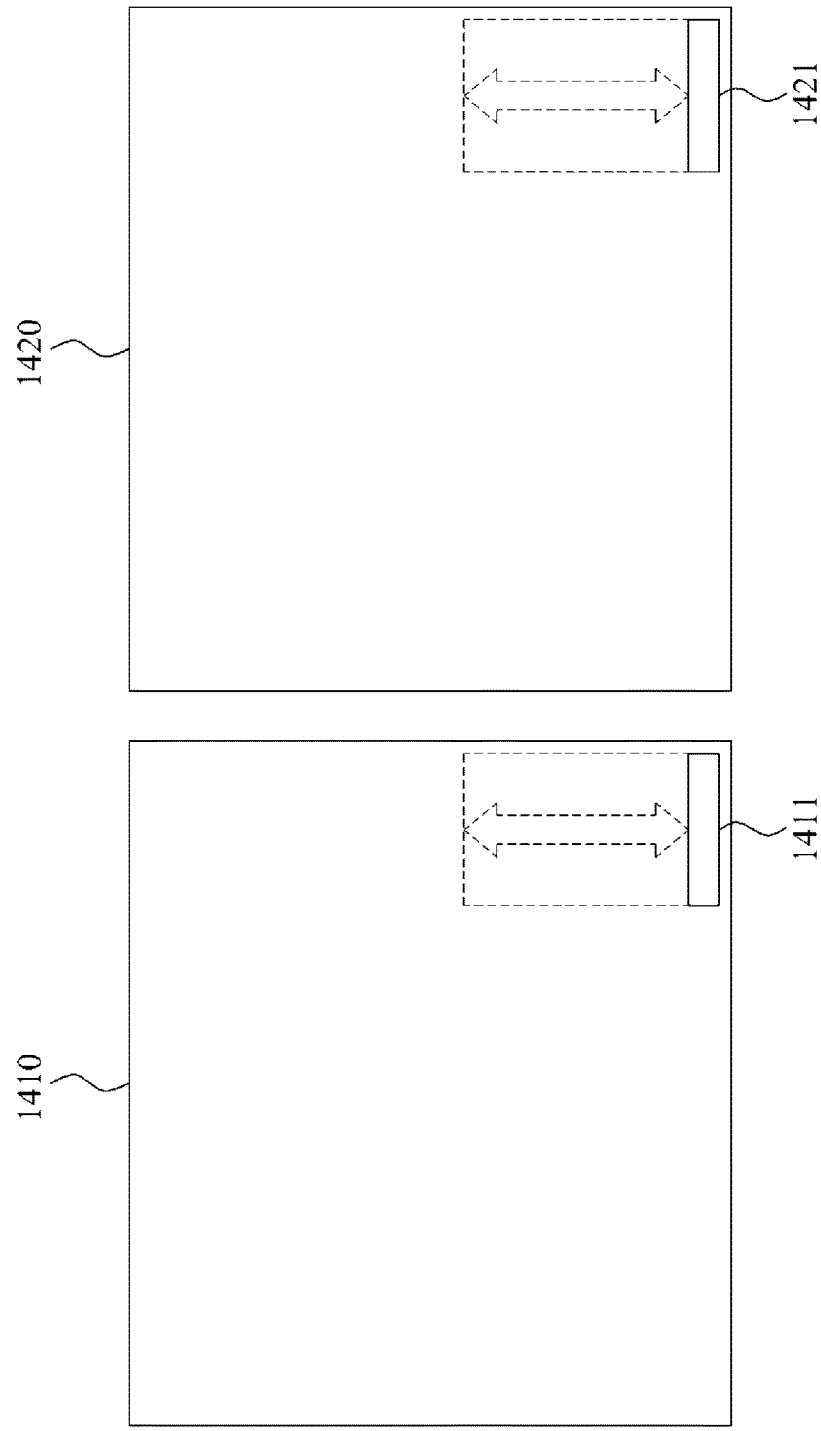
FIG. 14 is a diagram to illustrate screens of two different wired terminals according to exemplary embodiments of the present invention.

FIG. 14 is a diagram to illustrate screens of two different wired terminals according to exemplary embodiments of the present invention. FIG. 14 illustrates a first screen 1410 of a terminal and a second screen 1420 of another terminal. In the exemplary embodiment, user interfaces 1411 and 1421 appear on the first screen 1410 and the second screen 1420, respectively. The user interfaces 1411 and 1421 may be provided in the respective unified communication tools operating in wired terminals. In the exemplary embodiment, the user interfaces 1411 and 1421 may provide a user with similar operations as described with reference to FIG. 9 through FIG. 13.

Figure 15:
FIG. 15 is a diagram to illustrate a screen of a wireless terminal according to exemplary embodiments of the present invention.

FIG. 15 is a diagram to illustrate a screen of a wireless terminal according to exemplary embodiments of the present invention. A user interface entitled "quick write" 1510 may provide a function of facilitating a prompt reading of a message or document posted in a predetermined area in a community site, and of promptly writing a message or document to be posted, by a user, in a predetermined area in a community site. A user interface entitled "comcast" 1520 may inform a user that a new message is posted or a conversation has been requested, and may provide a function of posting a comment for a newly posted message or for having a conversation in response to a request for a conversation.

A user interface entitled "online" 1530 may include a function of informing a user about whether a friend, a neighbor, and the like are online, or of providing a user with content of a current conversation, and the like. The user interface entitled "online" 1530 may provide a function of having a conversation with a friend or neighbor in an online state. A user interface entitled "setting" 1540 may provide a function of an environmental setting of a unified communication tool which is installed and operates in a wireless terminal.

Figure 16:
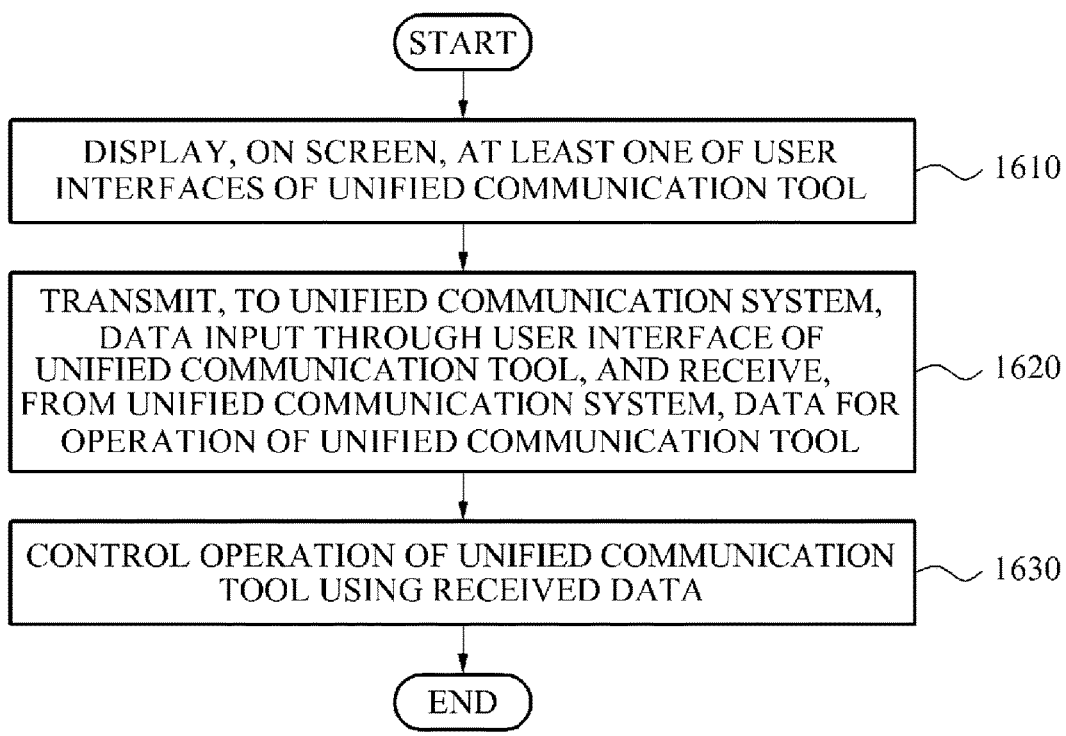
FIG. 16 is a flowchart to illustrate a communication method according to exemplary embodiments of the present invention.

FIG. 16 is a flowchart to illustrate a communication method according to exemplary embodiments of the present invention. The communication method according to exemplary embodiments of the present invention may be performed by the terminal 700 described with reference to FIG. 7. FIG. 16 illustrates a method for executing an application comprising operations performed by the terminal 700.

In operation 1610, the terminal 700 may display, on a screen, at least one of user interfaces of a unified communication tool. Here, the unified communication tool may operate in at least two environments among the following: in an environment where the unified communication tool operates as an overlay module on a web browser, in an environment where the unified communication tool is installed and operates in a wired terminal, and in an environment where the unified communication tool is installed and operates in a wireless terminal.

In the exemplary embodiment, if the terminal 700 uses a unified communication tool in the environment where the unified communication tool operates as an overlay module on a web browser, the terminal 700 may display, on a screen, an Internet window activated by the web browser, and may display, on a screen, a user interface of the unified communication tool. If a plurality of Internet windows are activated by the web browser, the unified communication tool may provide the same user interface to each of the plurality of Internet windows activated by the web browser.

If the terminal 700 uses a unified communication tool in the environment where the unified communication tool is installed and operates in a wired terminal, or in the environment where the unified communication tool is installed and operates in a wireless terminal, the terminal 700 may directly display, on a screen, user interfaces of the unified communication tool.

In operation 1620, the terminal 700 may transmit, to the unified communication system 200 of FIG. 2, input data entered through a user interface of the unified communication tool, and may receive, from the unified communication system 200, data for an operation of the unified communication tool.

In the exemplary embodiment, when a user logging in through a unified communication tool that operates in the terminal 700 is multi-logged in through the unified communication tool in at least one another terminal, a terminal to which data for an operation of the unified communication tool is to be transmitted may be determined based on information about the multi-login of the user. As described above, the information about the multi-login may be managed in the unified communication system 200, and in response to a user's multi-login, the unified communication system 200 may determine a terminal to which data for an operation of the unified communication tool is to be transmitted based on the information about the multi-login of the user.

For example, the terminal to which data for an operation of the unified communication tool is to be transmitted may be determined further based on at least one of an event occurring on terminals to which the user is multi-logged in, an operational environment of the unified communication tool used for the multi-login, and an environmental setting of the unified communication tool. A method for determining the terminal to which the data is to be transmitted was described above with reference to FIG. 2 through FIG. 6 and thus, further descriptions will be omitted for conciseness.

In operation 1630, the terminal 700 may control the operation of the unified communication tool using the received data. For example, when the received data corresponds to notification data, the terminal 700 may control so that the corresponding user interface of the unified communication tool may be displayed on a screen through operation 1610.

As described above, according to embodiments of the present invention, it is possible to provide a communication service any time without the need of directly accessing the corresponding service by providing a unified communication tool for at least one communication service associated with the user, and it is possible to provide a unified communication service by transmitting data based on multi-login information of a user managed by the system when the user is multi-logged in through unified communication tools operating in different respective terminals.

According to embodiments of the present invention, it is possible to provide a unified communication service regardless of whether a terminal used by a user is a wired terminal or a wireless terminal, whether an application is installed in a terminal, and the like, and it is possible to control an operation of a unified communication tool used for multi-login and a unified communication service.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor for unified communication, the method comprising:
   providing a communication tool for at least one communication server user;
   managing, by the processor, login information of a user when the user is logged into a plurality of terminals through a plurality of respective communication tools, the user being logged into the plurality of terminals simultaneously, wherein the login information includes an operational environment of each of the plurality of respective communication tools, and
   information on an environmental setting of each of the plurality of respective communication tools,
   storing the login information;
   identifying, by the processor, a terminal at which a latest user event has occurred, from among the plurality of terminals;
   determining, by the processor, the operational environment of the communication tool of the identified terminal according to the login information, the determined operational environment being one of a first operational environment and a second operational environment from among the operational environments of the plurality of respective communication tools, the first operational environment different from the second operational environment;
   determining whether to transmit data associated with the user to each of the plurality of terminals according to whether the determined operational environment is the first operational environment or the second operational environment;
   transmitting the data associated with the user to each of the plurality of terminals when the determined operational environment is the first operational environment;
   transmitting the data associated with the user to the identified terminal when the determined operational environment is the second operational environment;

wherein the plurality of respective communication tools are software modules executed on the plurality of terminals.

2. A non-transitory computer readable storage medium comprising an executable program, which when executed, performs the method of claim 1.

3. The method of claim 1, wherein
the first operational environment is a web browser in which the communication tool is configured to operate as an overlay module; and
the second operational environment is one of
a wired terminal on which the communication tool is installed and configured to operate, and
a wireless terminal on which the communication tool is installed and configured to operate.

4. A method for unified communication when a user is simultaneously logged into a plurality of terminals through a plurality of respective unified communication tools on the plurality of terminals, the method comprising:
displaying at least one user interface of a unified communication tool at a first terminal, among the plurality of terminals, at which a latest user event has occurred;
transmitting, to a unified communication system, input data entered through a user interface of the unified communication tool;
receiving, from the unified communication system, data for operation of the unified communication tool; and
controlling the operation of the unified communication tool using the received data;
wherein
the data for the operation of the unified communication tool is received at each of the plurality of terminals when an operational environment of the terminal is a first of a plurality of operational environments,
the data for the operation of the unified communication tool is received at the first terminal when the operational environment of the first terminal is a second of the plurality of operational environments, and
the first of the plurality of operational environments is different from the second of the plurality of operational environments;
wherein the multi-login information includes connectivity information indicating whether the plurality of terminals have a wired or wireless connection;
wherein the plurality of respective unified communication tools are software modules executed on the plurality of terminals.

5. The method of claim 4, wherein
the first operational environment is a web browser in which the communication tool is configured to operate as an overlay module; and
the second operational environment is one of
a wired terminal on which the communication tool is installed and configured to operate, and
a wireless terminal on which the communication tool is installed and configured to operate.

6. A communication system, comprising:
a processor including,
a communication tool provider configured to provide a communication tool for at least one communication server user,
a login manager configured to manage login information of a user when the user is logged into a plurality of terminals through a plurality of respective communication tools, the user being logged into the plurality of terminals simultaneously, the login manager storing the login information of the user in a storage unit, wherein the login information includes
an operational environment of each of the plurality of respective communication tools, and
information on an environmental setting of each of the plurality of respective communication tools,
a terminal determining unit configured to
identify a terminal at which a latest user event has occurred, from among the plurality of terminals,
determine the operational environment of the communication tool of the identified terminal according to the login information, the determined operational environment being one of a first operational environment and a second operational environment from among the operational environments of the plurality of respective communication tools, the first operational environment and the second operational environment being different, and
determine whether to transmit data associated with the user to each of the plurality of terminals according to whether the determined operational environment is the first operational environment or the second operational environment;
a memory storing instructions for implementing the communication tool provider, the login manager, and the terminal determining unit; and
a communication transceiver unit configured to
transmit the data associated with the user to each of the plurality of terminals when the determined operational environment is the first operational environment, and
transmit the data associated with the user to the identified terminal when the determined operational environment is the second operational environment;
wherein the plurality of respective communication tools are software modules executed on the plurality of terminals.

7. The communication system of claim 6, wherein the provided communication tool is configured to
provide the user with notification data transmitted from the at least one communication server,
transmit data input by the user to the at least one communication server, and
support a real-time conversation between the user and another user through the at least one communication server.

8. The communication system of claim 7, wherein the terminal determining unit is further configured to determine the plurality of terminals which the user is logged into based on the login information when the data associated with the user corresponds to the notification data.

9. The communication system of claim 6, wherein the communication tool of the identified terminal operates as an overlay module on a web browser, and is configured to provide the same user interface to a plurality of Internet windows activated by the web browser.

10. The communication system of claim 9, wherein data received from the plurality of respective communication tools is processed in the same manner on the plurality of Internet windows.

11. The communication system of claim 6, wherein the communication tool of the identified terminal comprises a user interface configured to enable the user to set, in response to login of the user to the identified terminal, at least one attribute to determine whether the user maintains a login status in a communication tool on a second of the plurality of terminals which the user is logged into.

12. The communication system of claim 6, wherein
the at least one of the plurality of respective communication tools comprises a user interface configured to enable the user to set a login status either to an online state or to an offline state; and
information on a login status of each of the plurality of respective communication tools to which the user is logged into is synchronized with the login status set by the user.

13. The communication system of claim 6, wherein
the communication transceiver unit is further configured to transmit, to each of the plurality of terminals, terminal information about the plurality of terminals which the user is logged into, and
each of the plurality of respective communication tools comprises a user interface configured to display the terminal information to the user.

14. The communication system of claim 13, wherein each of the plurality of respective communication tools comprises a user interface for the user to determine whether the terminal information is displayed.

15. The communication system of claim 6, wherein, in response to receiving a selection via the communication tool on the identified terminal, the login manager is configured to log in the user into the identified terminal, and log out the user from all others of the plurality of terminals, the selection not including a password.

16. The communication system of claim 6, wherein
the environmental setting of the communication tool of the identified terminal includes a multiple log-in verification setting that, when set, causes at least one other of the respective communication tools to, in response to a login of the user to the identified terminal, prompt the user to verify a log-in state of the at least one other terminal; and
the terminal determining unit is further configured to determine whether to transmit data associated with the user to each of the plurality of, terminals based on the operational environment of the communication tool of the identified terminal, the information on the environmental setting and verification of the log-in state of the others of the plurality of terminals.

17. The communication system of claim 6, wherein
the first operational environment is a web browser in which the communication tool is configured to operate as an overlay module; and
the second operational environment is one of
a wired terminal on which the communication tool is installed and configured to operate, and
a wireless terminal on which the communication tool is installed and configured to operate.

18. A terminal for unified communication when a user is simultaneously logged into a plurality of terminals through a plurality of respective unified communication tools on the plurality of terminals, the plurality of terminals including the terminal and at least one other terminal, and the terminal comprising:

a display device configured to display at least one user interface of a unified communication tool among the plurality of unified communication tools;
a data transceiver configured to transmit, to a unified communication system, input data entered through a user interface of the unified communication tool, and to receive, from the unified communication system, data for operation of the unified communication tool;
a processor including a controller configured to control the operation of the unified communication tool using the received data;
a memory storing instructions for implementing the controller; wherein
the data for the operation of the unified communication tool is received at each of the plurality of terminals when an operational environment of the unified communication tool of the terminal is a first of a plurality of operational environments and a latest user event has occurred at the terminal, and
the data for the operation of the unified communication tool is received at the terminal when the operational environment of the unified communication tool of the terminal is a second of the plurality of operational environments and the latest user even has occurred at the terminal;
wherein the first of the plurality of operational environments is different from the second of the plurality of operational environments;
wherein the multi-login information includes connectivity information indicating whether the terminal and the at least one other terminal have a wired or wireless connection;
wherein the plurality of respective unified communication tools are software modules executed on the plurality of terminals.

19. The terminal of claim 18, wherein the unified communication tool is configured to operate as an overlay module on a web browser, and to provide the same user interface to a plurality of Internet windows activated by the web browser.

20. The terminal of claim 19, wherein an operation according to data received from the unified communication tool is performed in the same manner in the same user interface provided to the plurality of Internet windows.

21. The terminal of claim 18, wherein
the first operational environment is a web browser in which the communication tool is configured to operate as an overlay module; and the second operational environment is one of
a wired terminal on which the communication tool is installed and configured to operate, and
a wireless terminal on which the communication tool is installed and configured to operate.

* * * * *